United States Patent
Liu et al.

(10) Patent No.: US 9,630,103 B2
(45) Date of Patent: Apr. 25, 2017

(54) GAME CONTROLLER

(71) Applicant: Primax Electronics Ltd., Neihu, Taipei (TW)

(72) Inventors: Chou-Liang Liu, Taipei (TW); Yu-Ming Chien, Taipei (TW); Chia-Hsiang Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 148 days.

(21) Appl. No.: 14/805,203

(22) Filed: Jul. 21, 2015

(65) Prior Publication Data

US 2016/0325176 A1 Nov. 10, 2016

(30) Foreign Application Priority Data

May 8, 2015 (TW) .............................. 104114790 A

(51) Int. Cl.
| | |
|---|---|
| *A63F 13/06* | (2006.01) |
| *A63F 13/24* | (2014.01) |
| *A63F 13/212* | (2014.01) |
| *A63F 13/285* | (2014.01) |

(52) U.S. Cl.
CPC ............ *A63F 13/24* (2014.09); *A63F 13/212* (2014.09); *A63F 13/285* (2014.09)

(58) Field of Classification Search
CPC ................................. A63F 13/06; A63F 13/10
See application file for complete search history.

(56) References Cited

U.S. PATENT DOCUMENTS

2001/0016518 A1* 8/2001 Nishiumi ................ A63F 13/06
463/36

* cited by examiner

*Primary Examiner* — Omkar Deodhar
(74) *Attorney, Agent, or Firm* — Kirton McConkie; Evan R. Witt

(57) ABSTRACT

A game controller includes a main body, a detachable electrode, a sensor and a controlling unit. The main body includes a grasping part. The detachable electrode is disposed on the grasping part. The sensor detects whether the detachable electrode is in contact with the grasping part. According to a result of judging whether the detachable electrode is in contact with the grasping part, the controlling unit controls the detachable electrode to generate a corresponding electric shock signal.

8 Claims, 3 Drawing Sheets

GAME CONTROLLER

FIELD OF THE INVENTION

The present invention relates to a game controller, and more particularly to a game controller with a detachable electrode.

BACKGROUND OF THE INVENTION

With increasing development of science and technology, the entertainment effects of electronic entertainment systems are gradually increased. Nowadays, many game consoles are introduced into the markets. For controlling most of the game consoles, game controllers are required. The widely-used game controller includes for example a game handle, a game joystick, a steering wheel, a mouse, and so on. For increasing the fun of playing the game, the game controller is usually provided with a feedback mechanism in coordination with the game. For example, the feedback mechanism is configured to generate vibration, emit a flashlight signal or generate a sound effect. Moreover, by the feedback mechanism of the game controller, the interaction between the user and the game is enhanced.

However, the feedback mechanisms of most game controllers can only generate feedback actions according to the settings of the games. Although the user can select different feedback actions according to the scenarios of the game, the user is unable to arbitrarily change the feedback mechanism of the game controller to achieve other purposes. If the user does not want to have the game controller generate the feedback actions, the user has to disable the feedback mechanism of the game controller. Under this circumstance, the arrangement of the feedback mechanism of the game controller wastes resources.

Moreover, although the game controller has the components of the feedback mechanism, the feedback mechanism of the game controller is not enabled after the game is ended. Since the game controller is no longer operated to control the game, the feedback function of the game controller is lost.

In other words, it is important to increase the use value of the game controller by making use of the feedback mechanism of the game controller. Therefore, there is a need of providing an improved game controller in order to overcome the above drawbacks.

SUMMARY OF THE INVENTION

An object of the present invention provides a multi-function game controller.

In accordance with an aspect of the present invention, there is provided a game controller for controlling a game console. The game controller includes a main body, a detachable electrode, a sensor and a controlling unit. The main body includes a grasping part. The detachable electrode is disposed on the grasping part and provides an electric shock function. The sensor detects whether the detachable electrode is in contact with the grasping part. The controlling unit is electrically connected with the detachable electrode and the sensor. If the detachable electrode is in contact with the grasping part, the detachable electrode generates a first electric shock signal according to an electric shock command from the game console. If the detachable electrode is not in contact with the grasping part, the detachable electrode generates a second electric shock signal according to a relaxation shock setting of the controlling unit.

In an embodiment, the game controller further includes a first fixing element and a second fixing element. The first fixing element is disposed on the grasping part, the second fixing element is disposed on the detachable electrode, and the detachable electrode is fixed on the grasping part through the first fixing element and the second fixing element.

In an embodiment, the first fixing element and the second fixing element are magnets.

In an embodiment, the game controller further includes a power source. The power source is disposed within the main body and electrically connected with the detachable electrode. The power source provides electric power to the detachable electrode.

In an embodiment, the game controller further includes a connecting wire and a wire reel. The connecting wire is selectively stored in the wire reel or released from the wire reel. The connecting wire is electrically connected with the power source and the detachable electrode. The electric power is transmitted to the detachable electrode through the connecting wire.

In an embodiment, the game controller further includes an electric shock switch. The electric shock function of the detachable electrode is selectively enabled or disabled by turning on or turning off the electric shock switch.

In an embodiment, the sensor is a magnetic sensor.

In an embodiment, after the game console recognizes a current game scenario, the game console generates a corresponding electric shock command according to the game scenario. The controlling unit sets an output frequency and an output current of the first electric shock signal according to the electric shock command. The game scenario includes an attack undergoing scenario or a dying scenario.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
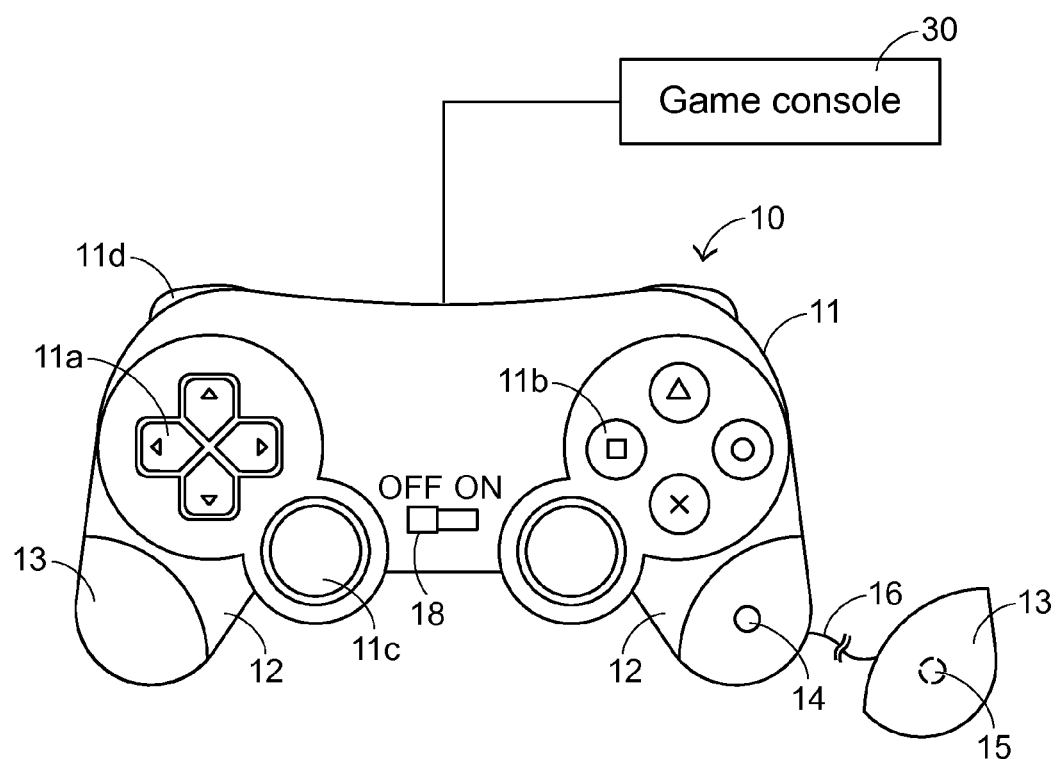
FIG. 1 schematically illustrates the appearance of a game controller according to an embodiment of the present invention.
Figure 2:
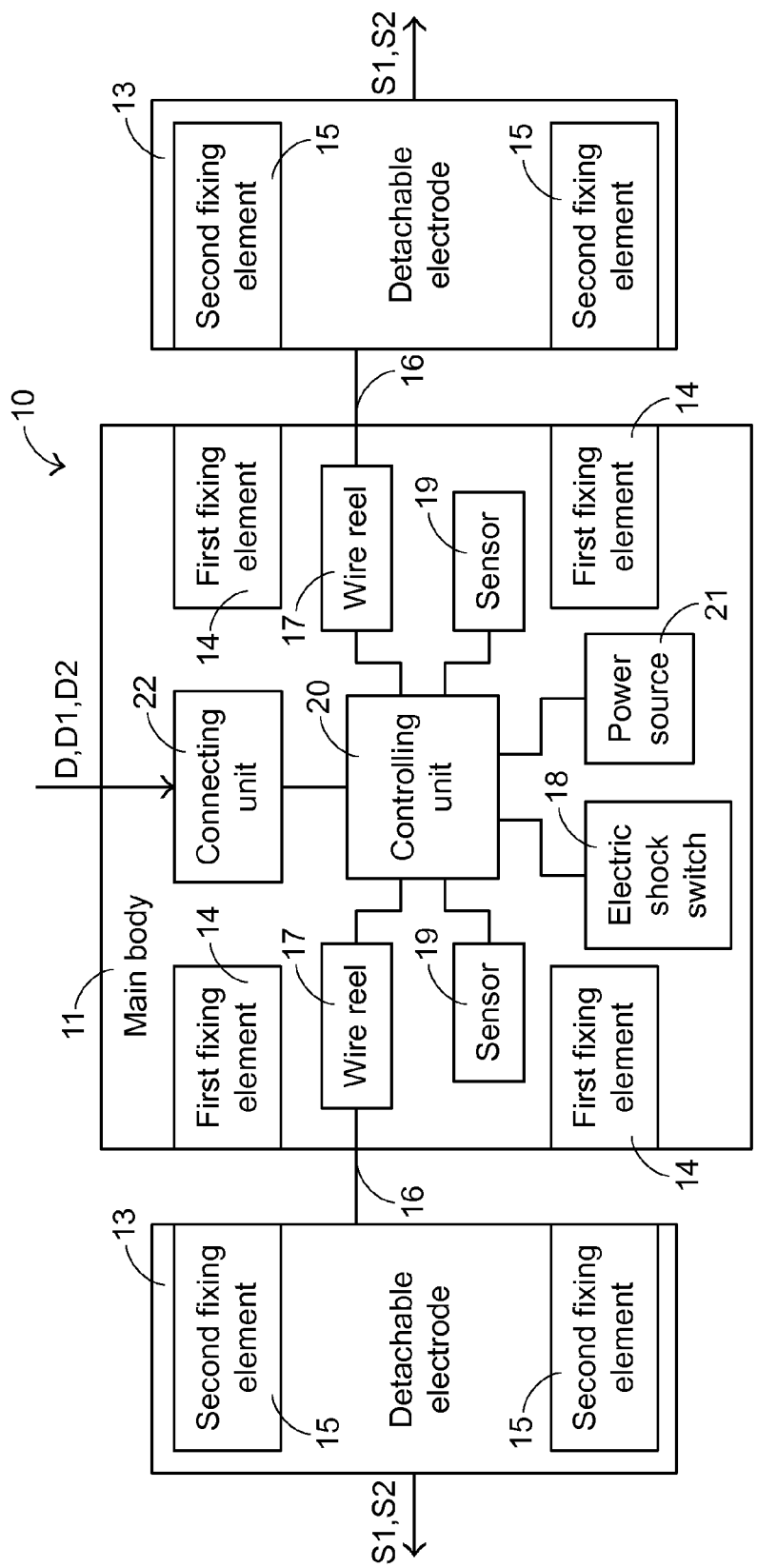
FIG. 2 is schematic functional block diagram illustrating the game controller according to the embodiment of the present invention.

Please refer to FIGS. 1 and 2. FIG. 1 schematically illustrates the appearance of a game controller according to an embodiment of the present invention. FIG. 2 is schematic functional block diagram illustrating the game controller according to the embodiment of the present invention. The game controller 10 is used for controlling a game console 30 in order to play a game of the game console 30. An example of the game controller 10 includes but is not limited to a game handle, a game joystick, a steering wheel, a mouse or any other well-known game controller. For example, the game console 30 is a Sony PlayStation console, an Xbox console, a Wii console or any other appropriate game console. In this embodiment, the game controller 10 is a game handle that is handheld by the both hands of the user.

Please refer to FIGS. 1 and 2 again. The game controller 10 comprises a main body 11, two detachable electrodes 13, four first fixing elements 14, four second fixing elements 15, two connecting wires 16, two wire reels 17, an electric shock switch 18, two sensors 19, a controlling unit 20, a power source 21 and a connecting unit 22. Moreover, a cross key 11a, plural buttons 11b and two analog joysticks 11c are installed on a top surface of the main body 11. Moreover, two push buttons 11d are disposed on a lateral surface of the main body 11. Through the cross key 11a, the buttons 11b, the analog joysticks 11c and the push buttons 11d, corresponding input signals are generated. According to the input signals, the game of the game console 30 can be correspondingly controlled. The functions of the cross key 11a, the buttons 11b, the analog joysticks 11c and the push buttons 11d are similar to those of the conventional game controller, and are not redundantly described herein. It is noted that numerous modifications and alterations may be made while retaining the teachings of the invention. For example, in another embodiment, the cross key, the buttons, the analog joysticks and the push buttons are not installed on the top surface of the main body.

The main body 11 comprises two grasping parts 12. The two grasping parts 12 are located at two ends of the main body 11, respectively. Moreover, the two grasping parts 12 are protruded from the main body 11. Consequently, the main body 11 can be held by one hand or two hands of the user.

The two detachable electrodes 13 are disposed on the surfaces of the two grasping parts 12, respectively. The two detachable electrodes 13 can provide an electric shock function to generate electric shock to the user. Regardless of whether the detachable electrodes 13 are in contact with the grasping parts 12 or not, the two detachable electrodes 13 can provide the electric shock function. The electric shock function of the detachable electrodes 13 will be illustrated in more details as follows.

Moreover, the game controller 10 is equipped with the first fixing elements 14 and the second fixing elements 15. Consequently, the detachable electrodes 13 can be detached from the surfaces of the corresponding grasping parts 12 at will, or the detachable electrodes 13 can be securely fixed on the surfaces of the grasping parts 12 when the detachable electrodes 13 are in contact with the surfaces of the grasping parts 12. In this embodiment, two first fixing elements 14 are disposed on one of the two grasping parts 12, and the other two first fixing elements 14 are disposed on the other grasping part 12. The first fixing elements 14 are installed on the surfaces of the grasping parts 12. Preferably but not exclusively, receiving recesses (not shown) are formed in the surface of the grasping parts 12, and the first fixing elements 14 are inserted into corresponding receiving recesses. In some embodiments, the first fixing elements 14 are directly attached on the inner surface of the grasping parts 12 or directly attached on the outer surface of the grasping parts 12.

The second fixing elements 15 are disposed on the surfaces of the corresponding detachable electrodes 13. Moreover, the positions of the second fixing elements 15 correspond to the first fixing elements 14. For example, the second fixing elements 15 are disposed on the inner surfaces of the corresponding detachable electrodes 13. When the detachable electrodes 13 are in contact with the corresponding grasping parts 12, the first fixing elements 14 and the corresponding second fixing elements 15 are magnetically attracted by each other. Consequently, the detachable electrodes 13 are fixed on the corresponding grasping parts 12.

In other words, the detachable electrodes 13 are fixed on the surfaces of the corresponding grasping parts 12 through the connection between the first fixing elements 14 and the second fixing elements 15. Moreover, when the first fixing elements 14 and the second fixing elements 15 are detached from each other, the detachable electrodes 13 are detached from the surfaces of the corresponding grasping parts 12.

In this embodiment, the first fixing elements 14 and the second fixing elements 15 are magnets. It is noted that the examples of the first fixing elements 14 and the second fixing elements 15 are not restricted. For example, in some other embodiments, the first fixing elements 14 and the second fixing elements 15 include hooks, buckles, Velcro fasteners or any other appropriate fixing elements. As mentioned above, each detachable electrode 13 is fixed on the corresponding grasping part 12 through two first fixing elements 14 and two second fixing elements 15. It is noted that the number of the first fixing elements 14 and the number of the second fixing elements 15 are not restricted.

Please refer to FIG. 2 again. The detachable electrodes 13, the electric shock switch 18, the sensors 19, the power source 21 and the connecting unit 22 are electrically connected with the controlling unit 20, and controlled by the controlling unit 20. Moreover, the detachable electrodes 13 are electrically connected with the controlling unit 20 through the corresponding connecting wires 16 so as to provide the electric shock function. The electric shock switch 18 is disposed on the top surface of the main body 11. By turning on or turning off the electric shock switch 18, the electric shock function of the detachable electrodes 13 is selectively enabled or disabled. The sensors 19 are disposed within the corresponding grasping parts 12 and located beside the corresponding detachable electrodes 13. The sensors 19 are used for detecting whether the detachable electrodes 13 are in contact with the corresponding grasping parts 12.

In this embodiment, the electric shock function of the detachable electrodes 13 is selectively enabled or disabled by turning on or turning off the electric shock switch 18. An example of the electric shock switch 18 includes but is not limited to a push button or a toggle switch. In some other embodiments, the electric shock function of the detachable electrodes 13 is selectively enabled or disabled through the electric shock switch 18, and the electric shock level is adjustable through the electric shock switch 18. Since the first fixing elements 14 and the second fixing elements 15 of this embodiment are magnets, the sensors 19 are magnetic sensors for detecting a magnetic force change near the main body 11. According to the magnetic force change, the sensors 19 judges whether the detachable electrodes 13 are in contact with the corresponding grasping parts 12. For example, the sensors 19 are Hall sensors.

The power source 21 is disposed within the main body 11. For example, the power source 21 is a primary battery, a chargeable battery or a power input port. The power source 21 is used for providing electric power to detachable electrodes 13, the electric shock switch 18, the sensors 19, the controlling unit 20, the connecting unit 22 and other power consumption components of the game controller 10. The connecting unit 22 is disposed within the main body 11. Through the connecting unit 22, the main body 11 is connected with the game console 30, and the game controller 10 is in communication with the game console 30. Consequently, the game console 30 can be controlled by the game controller 10. An example of the connecting unit 22 includes but is not limited to a cable, a wired connecting port or a wireless communication module. For example, the connecting unit 22 is a USB connecting port or a Bluetooth module.

When a game is executed by the game console 30, the game console 30 is controlled by the game controller 10 so as to operate the game. The message generated by the game controller 10 can be transmitted to the game console 30 through the connecting unit 22. In addition, the message from the game console 30 can be received by the connecting unit 22. On the other hand, when the game is executed by the game console 30, the game console 30 can recognize a current game scenario and generate a corresponding electric shock command D according to the game scenario. The electric shock command D is transmitted from the game console 30 to the game controller 10. According to the electric shock command D, the game controller 10 sets the output frequency and the output current of the electric shock signal. For example, the game scenario includes an attack undergoing scenario or a dying scenario.

For example, if an important role of the game is undergoing an attack from the hostile forces, the game console 30 recognizes that the game scenario is the attack undergoing scenario. Consequently, a first electric shock command D1 is transmitted from the game console 30 to the game controller 10 (see FIG. 2). According to the first electric shock command D1, the game controller 10 sets a lower output frequency and a lower output current of the electric shock signal. In case that the detachable electrode 13 is in contact with the grasping part 12, the detachable electrode 13 generates the electric shock signal with the lower output frequency and the lower output current so as to provide the low-stimulus electric shock function. On the other hand, if the important role of the game is attacked by the hostile forces and is dying, the game console 30 recognizes that the game scenario is the dying scenario. Consequently, a second electric shock command D2 is transmitted from the game console 30 to the game controller 10 (see FIG. 2). According to the second electric shock command D2, the game controller 10 sets a higher output frequency and a higher output current of the electric shock signal. In case that the detachable electrode 13 is in contact with the grasping part 12, the detachable electrode 13 generates the electric shock signal with the higher output frequency and the higher output current so as to provide the high-stimulus electric shock function. Since the user feels different electric shock levels in different game scenarios, the fun of playing the game is enhanced.

Moreover, according to the user's requirements, the detachable electrode 13 is selectively assembled with the surface of grasping part 12 or detached from the surface of grasping part 12. Regardless of whether the detachable electrode 13 is in contact with the grasping part 12, the detachable electrode 13 has the electric shock function as long as the game controller 10 is normally operated and the electric shock switch 18 is turned on. For still providing the electric shock function of the detachable electrode 13 when the detachable electrode 13 is detached from the grasping part 12, the connecting wire 16 between the controlling unit 20 and the detachable electrode 13 has a predetermined length. Preferably but not exclusively, the predetermined length of the connecting wire 16 is 1 meter. In other words, when the detachable electrode 13 is detached from the grasping part 12, the distance of the detachable electrode 13 from the grasping part 12 is 1 meter.

Since the connecting wire 16 is long (e.g., 1 meter), the game controller 10 of this embodiment further comprises the wire reel 17 in order to prevent entanglement of the connecting wire 16 and facilitate storing the connecting wire 16. The wire reel 17 is disposed within the main body 11 for selectively storing or releasing the connecting wire 16. In case that the detachable electrode 13 is in contact with the grasping part 12, the connecting wire 16 is wound around the wire reel 17, so that the connecting wire 16 is not disordered. Whereas, in case that the detachable electrode 13 is detached from the grasping part 12, the connecting wire 16 wound around the wire reel 17 is released because the distance between the detachable electrode 13 and the grasping part 12 is gradually increased. Under this circumstance, the detachable electrode 13 can continuously acquire the electric power in order to provide the electric shock function. The wire reel 17 is a well-known wire reel such as an automatic wire reel with a spring or a manual wire reel. The operating principles of the wire reel 17 are known to those skilled in the art, and are not redundantly described herein.

Figure 3:
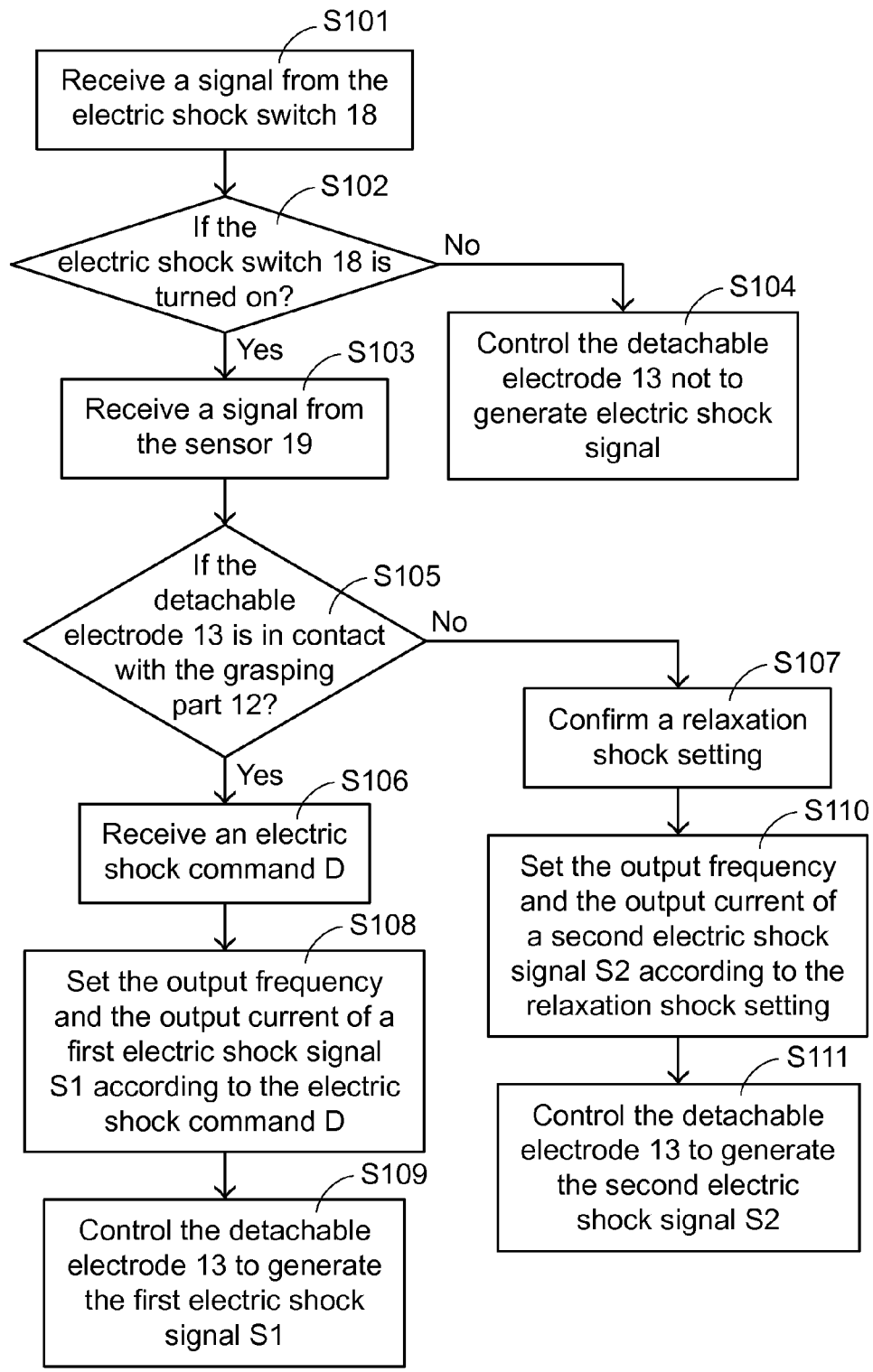
FIG. 3 is a flowchart illustrating a control method of the game controller according to an embodiment of the present invention.

FIG. 3 is a flowchart illustrating a control method of the game controller according to an embodiment of the present invention. Please refer to FIGS. 2 and 3. In a step S101, the controlling unit 20 receives a signal from the electric shock switch 18. In a step S102, the controlling unit 20 judges whether the electric shock switch 18 is turned on. If the electric shock switch 18 is turned on, a step S103 is performed. Whereas, if the electric shock switch 18 is turned off, a step S104 is performed. In the step S104, no electric shock signal is generated by the detachable electrode 13 under control of the controlling unit 20.

In the step S103, the controlling unit 20 receives a signal from the sensor 19. In a step S105, the controlling unit 20 judges whether the detachable electrode 13 is in contact with the grasping part 12 according to the signal from the sensor 19. If the detachable electrode 13 is in contact with the grasping part 12, a step S106 is performed. Whereas, if the detachable electrode 13 is not in contact with the grasping part 12, a step S107 is performed.

In the step S106, the connecting unit 22 receives an electric shock command D from the game console 30, and transmits the electric shock command D to the controlling unit 20. Consequently, the electric shock command D from the game console 30 is received by the controlling unit 20. Then, in a step S 108, the controlling unit 20 sets the output frequency and the output current of a first electric shock signal S1 according to the electric shock command D. The relationships between the electric shock command D of the game console 30 and the output frequency and the output current of a first electric shock signal S1 have been mentioned as above, and are not redundantly described herein. Then, in a step S109, the first electric shock signal S1 is generated by the detachable electrode 13 under control of the controlling unit 20.

If the detachable electrode 13 is not in contact with the grasping part 12 according to the judging result of the step S105, the step S107 is performed. In the step S107, the controlling unit 20 confirms a relaxation shock setting. In this embodiment, the relaxation shock setting is a built-in relaxation shock setting of the controlling unit 20. More especially, the relaxation shock setting is a shock setting that can be done by the user. In a step S110, the controlling unit 20 sets the output frequency and the output current of a second electric shock signal S2 according to the relaxation shock setting. For example, the second electric shock signal S2 is a sustained electric shock signal having a higher output frequency and a lower output current. Then, in a step S111, the second electric shock signal S2 is generated by the detachable electrode 13 under control of the controlling unit 20. According to the second electric shock signal S2, the purpose of relaxing the user is achieved. For example, when the detachable electrode 13 is attached on a wrist, an arm, a shoulder, a neck or any other site of the user, the muscles of the user can be relaxed according to the second electric shock signal S2 generated by the detachable electrode 13.

Especially, in case that the detachable electrode 13 is not in contact with the grasping part 12, even if the electric shock command D from the game console 30 is received by the connecting unit 22, the first electric shock signal S1 is not generated by the detachable electrode 13. That is, when the detachable electrode 13 is detached from the grasping part 12, the user does not get the electric shock in response to the game scenario.

From the above descriptions, the present invention provides a game controller. According to a result of judging whether the detachable electrode is in contact with the grasping part through the sensor, the detachable electrode is controlled to generate a corresponding electric shock signal. Consequently, the detachable electrode provides not only a game feedback function but also a relaxation function. The function of the detachable electrode is changed according to the user's requirements. After the game is ended, if the user allows the detachable electrode to implement the relaxation function subsequently, the efficacy of relaxing muscles and eliminate fatigue will be enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A game controller for controlling a game console, the game controller comprising:
    a main body comprising a grasping part;
    a detachable electrode disposed on the grasping part and providing an electric shock function;
    a sensor detecting whether the detachable electrode is in contact with the grasping part; and
    a controlling unit electrically connected with the detachable electrode and the sensor, wherein if the detachable electrode is in contact with the grasping part, the detachable electrode generates a first electric shock signal according to an electric shock command from the game console, wherein if the detachable electrode is not in contact with the grasping part, the detachable electrode generates a second electric shock signal according to a relaxation shock setting of the controlling unit.

2. The game controller according to claim 1, further comprising a first fixing element and a second fixing element, wherein the first fixing element is disposed on the grasping part, the second fixing element is disposed on the detachable electrode, and the detachable electrode is fixed on the grasping part through the first fixing element and the second fixing element.

3. The game controller according to claim 2, wherein the first fixing element and the second fixing element are magnets.

4. The game controller according to claim 1, further comprising a power source, wherein the power source is disposed within the main body and electrically connected with the detachable electrode, wherein the power source provides electric power to the detachable electrode.

5. The game controller according to claim 4, further comprising a connecting wire and a wire reel, wherein the connecting wire is selectively stored in the wire reel or released from the wire reel, wherein the connecting wire is electrically connected with the power source and the detachable electrode, and the electric power is transmitted to the detachable electrode through the connecting wire.

6. The game controller according to claim 1, further comprising an electric shock switch, wherein the electric shock function of the detachable electrode is selectively enabled or disabled by turning on or turning off the electric shock switch.

7. The game controller according to claim 1, wherein the sensor is a magnetic sensor.

8. The game controller according to claim 1, wherein after the game console recognizes a current game scenario, the game console generates a corresponding electric shock command according to the game scenario, wherein the controlling unit sets an output frequency and an output current of the first electric shock signal according to the electric shock command, wherein the game scenario includes an attack undergoing scenario or a dying scenario.

* * * * *